(12) United States Patent
Chung

(10) Patent No.: US 9,207,449 B2
(45) Date of Patent: Dec. 8, 2015

(54) ELECTROWETTING DISPLAY DEVICE, METHOD OF DRIVING THE SAME, AND METHOD OF MANUFACTURING THE SAME

(71) Applicant: Samsung Electronics Co., Ltd., Suwon-Si, Gyeonggi-Do (KR)

(72) Inventor: Deuk-seok Chung, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/180,511

(22) Filed: Feb. 14, 2014

(65) Prior Publication Data

US 2014/0232621 A1 Aug. 21, 2014

(30) Foreign Application Priority Data

Feb. 15, 2013 (KR) .................. 10-2013-0016597

(51) Int. Cl.
*G09G 5/00* (2006.01)
*G02B 26/00* (2006.01)

(52) U.S. Cl.
CPC ......... *G02B 26/005* (2013.01); *Y10T 29/49117* (2015.01)

(58) Field of Classification Search
CPC ....... G09G 3/348; G09G 3/28; G02B 26/005; Y10T 29/49117

USPC ........ 345/55, 84, 85, 204, 690; 359/290–292, 359/297

See application file for complete search history.

(56) References Cited

U.S. PATENT DOCUMENTS

| 8,174,772 | B1 * | 5/2012 | DeVaul .................... 359/665 |
| 2008/0150867 | A1 * | 6/2008 | Miyata et al. ............... 345/93 |
| 2008/0297880 | A1 * | 12/2008 | Steckl et al. ............... 359/291 |
| 2009/0046082 | A1 | 2/2009 | Jacobson et al. |
| 2011/0084944 | A1 * | 4/2011 | Bae ........................... 345/205 |

\* cited by examiner

*Primary Examiner* — Jennifer Nguyen
(74) *Attorney, Agent, or Firm* — Harness, Dickey & Pierce, P.L.C.

(57) ABSTRACT

An electrowetting display device includes first and second substrates facing each other and separated from each other, a cell region between the first and second substrates, the cell region including a pixel region and a reservoir region, a first fluid and a second fluid in the cell region, the first fluid being conductive and flowing according to an electrowetting principle and the second fluid being non-conductive and not mixed with the first fluid, and an electrode unit turning on and off the pixel region, the electrode unit including a pixel electrode coated with an insulating material and at least one reservoir electrode coated with the insulating material to promote flow of one of the first fluid and the second fluid into the reservoir region.

18 Claims, 9 Drawing Sheets

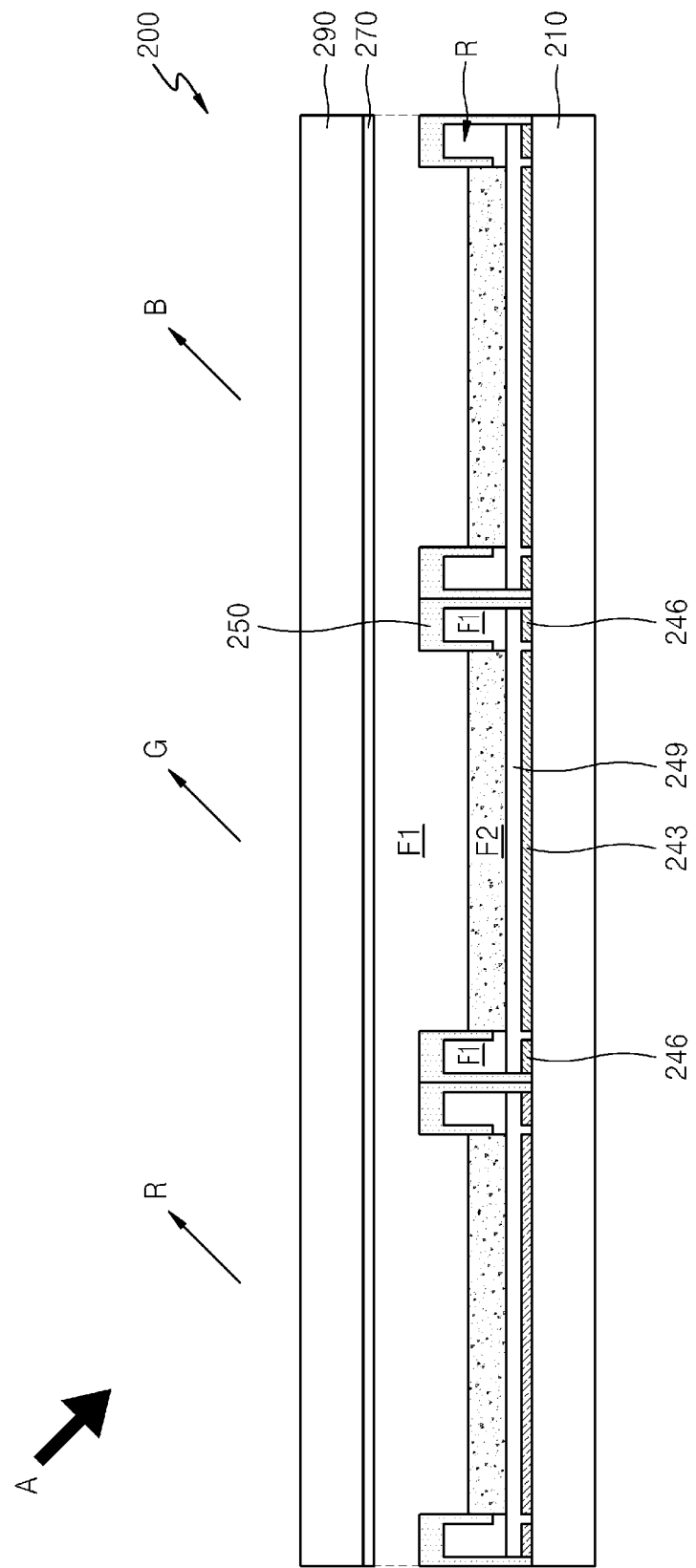

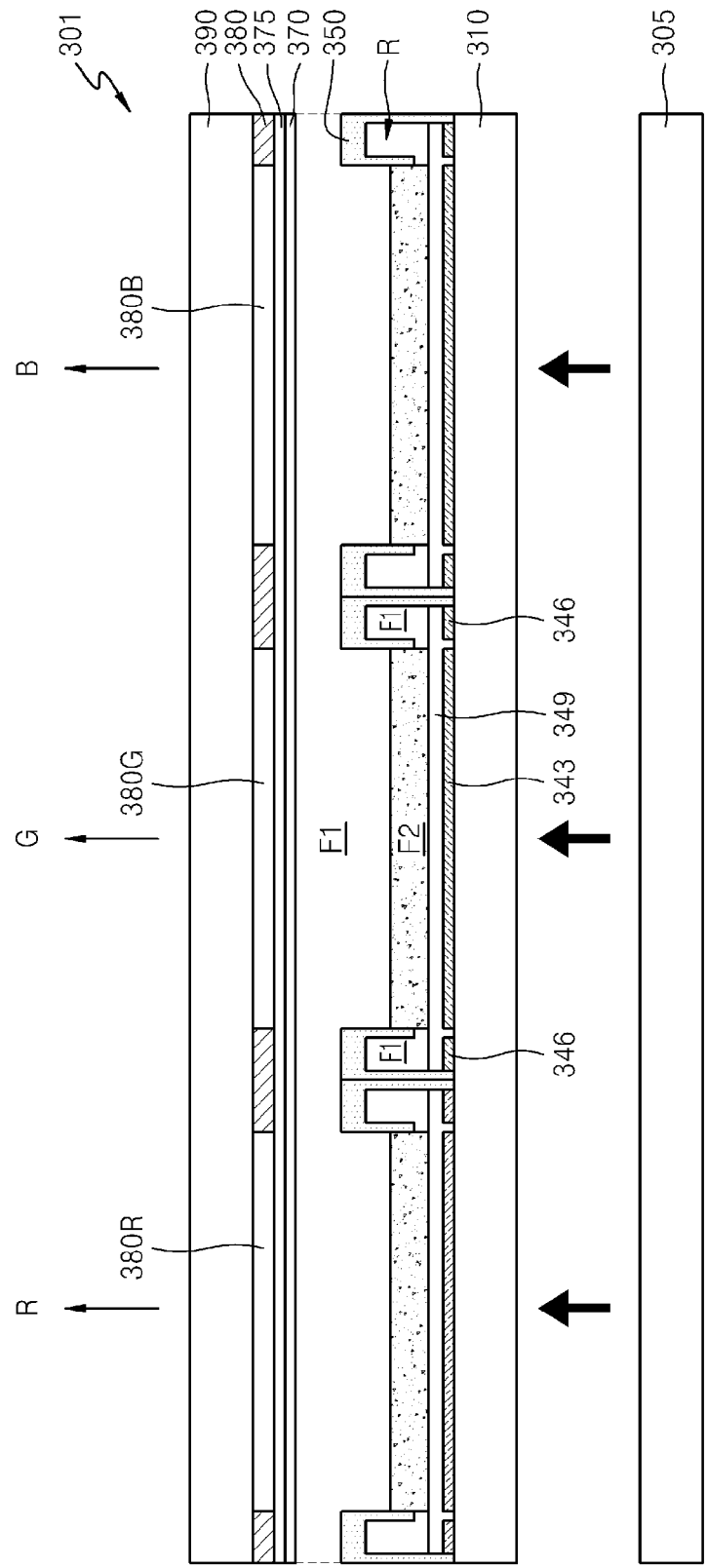

ELECTROWETTING DISPLAY DEVICE, METHOD OF DRIVING THE SAME, AND METHOD OF MANUFACTURING THE SAME

CROSS-REFERENCE TO RELATED APPLICATIONS

This application claims the benefit of Korean Patent Application No. 10-2013-0016597, filed on Feb. 15, 2013, in the Korean Intellectual Property Office, the disclosure of which is incorporated herein in its entirety by reference.

BACKGROUND

1. Field

Some example embodiments relate to electrowetting display devices, methods of driving the same, and/or methods of manufacturing the same.

2. Description of the Related Art

Wetting is a phenomenon of increasing a surface of a boundary between a solid and a liquid when the solid, the liquid, and a gas contact each other. Wetting occurs not only between a solid and a liquid but also between two liquids that are not mixed with each other. In electrowetting, which is a kind of wetting, a contact angle formed between a conductive liquid droplet that comes into contact with a surface of a solid changes according to a voltage applied to the liquid. For example, when no voltage is applied to a droplet placed on an electrode that is coated with a hydrophobic insulating material, a force (interfacial tension) for reducing a contact area between a solid and a liquid to be as small as possible acts to the droplet since the interaction force between liquid molecules is greater than that between the liquid and the solid.

Therefore, the droplet maintains a contact angle with the solid to be greater than 90° according to the respective interfacial tension of the three phases of solid, liquid, and gas, and thus, a round shape of the droplet is maintained. However, when a voltage is applied between the conductive droplet and the electrode that is coated with a hydrophobic insulating material, electrostatic attraction is generated between the droplet and a surface of the solid, and thus, a contact angle of the droplet with the solid is reduced and the droplet spreads out. At this point, the degree of spreading, that is, the contact angle of the droplet, may be controlled by controlling the intensity of the applied voltage.

By using the principle described above, display pixels provided with an electrode coated with an insulating material and filled with oil and electrolyte may be turned on/off by controlling a voltage applied to the electrode.

SUMMARY

Some example embodiments provide electrowetting display devices, methods of driving the same, and/or methods of manufacturing the same.

Additional aspects will be set forth in part in the description which follows and, in part, will be apparent from the description, or may be learned by practice of the presented embodiments.

According to an example embodiment, an electrowetting display device includes first and second substrates facing each other and separated from each other, a cell region between the first and second substrates, the cell region including a pixel region and a reservoir region, a first fluid and a second fluid in the cell region, the first fluid being conductive and flowing according to an electrowetting principle and the second fluid being non-conductive and not mixed with the first fluid, and an electrode unit turning on and off the pixel region, the electrode unit including a pixel electrode coated with an insulating material and at least one reservoir electrode coated with the insulating material to promote flow of one of the first fluid and the second fluid into the reservoir region.

The electrode unit may further include a common electrode on a surface of the second substrate closest to the first substrate. The pixel electrode may be on a surface of the first substrate facing the pixel region, and the reservoir electrode may be on a surface of the first substrate facing the reservoir region.

The electrowetting display device may further include a partition unit on the first substrate, the partition unit defining the cell region. The partition unit may include a first surface facing outward from the cell region, a second surface facing the cell region, and a third surface connecting the first and second surfaces and facing upward from the cell region, and the reservoir region may be in a region between the first and second surfaces of the partition unit. The partition unit may include a first wall having the first surface, a second wall having the second surface and separate from the first wall, and a third wall having the third surface and connecting the first and second walls, and the reservoir region may be surrounded by the first through third walls.

The second wall may be separated from a bottom surface of the cell region by a distance to form a flow path through which the first fluid and the second fluid flow between the pixel region and the reservoir region. The reservoir electrode may extend along the first wall from a surface of the first substrate facing the reservoir region. The reservoir electrode may extend towards the third wall. The first fluid may be transparent and the second fluid may block light.

The electrowetting display device may further include a reflective color filter on the first substrate. The electrowetting display device may further include a back light device on a surface of the first substrate furthest from the second substrate, and a transmissive color filter on a surface of the second substrate closest to the first substrate.

The first fluid may be transparent, and the second fluid may transmit light of a given color. The electrowetting display device may further include a back light device on a surface of the first substrate furthest from the second substrate.

According to another example embodiment, a method of driving the electrowetting display device includes applying an attractive electric force between the first fluid and the reservoir electrode and not between the first fluid and the pixel electrode so that the first fluid moves into the reservoir region, and applying an attractive electric force between the first fluid and the pixel electrode and not between the first fluid and the reservoir electrode so that the second fluid moves into the reservoir region.

The pixel region may block light when applying an attractive electric force between the first fluid and the reservoir electrode and not between the first fluid and the pixel electrode, and the pixel region may transmit light when applying an attractive electric force between the first fluid and the pixel electrode and not between the first fluid and the reservoir electrode.

The pixel region may transmit light of a given color when applying an attractive electric force between the first fluid and the reservoir electrode and not between the first fluid and the pixel electrode, and the pixel region may transmit light of a given color when applying an attractive electric force between the first fluid and the pixel electrode and not between the first fluid and the reservoir electrode.

When applying an attractive electric force between the first fluid and the reservoir electrode and not between the first fluid and the pixel electrode, an electric potential may be applied to the first fluid and the reservoir electrode so that an electric potential difference is generated between the first fluid and the reservoir electrode and an electric potential equal to that of the first fluid may be applied to the pixel electrode. When applying an attractive electric force between the first fluid and the pixel electrode and not between the first fluid and the reservoir electrode, an electric potential may be applied to the first fluid and the pixel electrode so that an electric potential difference is generated between the first fluid and the pixel electrode and an electric potential equal to that of the first fluid may be applied to the reservoir electrode.

According to yet another example embodiment, a method of manufacturing an electrowetting display device includes forming a pixel electrode and a reservoir electrode on a first substrate and forming an insulating material layer covering the pixel electrode and the reservoir electrode, forming a cell region on the first substrate including forming a partition unit to define a pixel region, and forming a reservoir region inside the partition unit, disposing a first fluid and a second fluid in the cell region, the first fluid being conductive and the second fluid being non-conductive and not mixed with the first fluid, and covering the cell region with a second substrate.

Forming the cell region may include forming a sacrificial pattern layer having a shape corresponding to the reservoir region that is to be formed inside the partition unit, forming a partition unit material layer along surfaces of the sacrificial pattern layer using a material having an etch selectivity with respect to a material of the sacrificial pattern layer, and removing the sacrificial pattern layer.

BRIEF DESCRIPTION OF THE DRAWINGS

These and/or other aspects will become apparent and more readily appreciated from the following description of the embodiments, taken in conjunction with the accompanying drawings of which:

FIGS. 1A and 1B are schematic cross-sectional views illustrating a structure of an electrowetting display device, wherein FIG. 1A shows a pixel-off state in which light is blocked and FIG. 1B shows a pixel-on state of a pixel in which light is transmitted, according to an example embodiment;

FIGS. 2A and 2B are schematic cross-sectional views illustrating a structure of an electrowetting display device, wherein FIG. 2A shows a pixel-off state in which light is blocked and FIG. 2B shows a pixel-on state in which light is transmitted, according to another example embodiment;

FIG. 3 a schematic cross-sectional view illustrating a structure of an electrowetting display device according to another example embodiment;

FIG. 6 a schematic cross-sectional view illustrating a structure of an electrowetting display device according to another example embodiment.

DETAILED DESCRIPTION

Figure 1A:
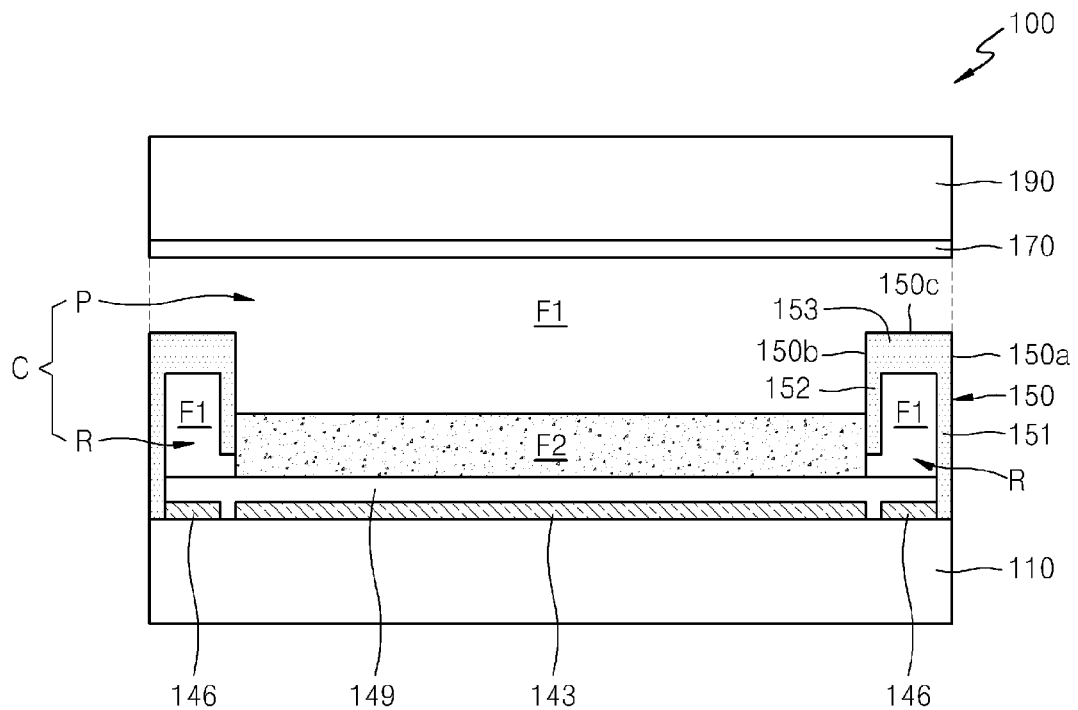

Electrowetting display devices, methods of operation the same, and methods of manufacturing the same will now be described in detail with reference to the accompanying drawings. In the drawings, like reference numerals refer to the like elements throughout, and the sizes of constituent elements are exaggerated for clarity and convenience of explanation. The embodiments described below are just examples of the inventive concepts, which can be variously modified. It will be understood that when an element or layer is referred to as being "formed on," another element or layer, it can be directly or indirectly formed on the other element or layer.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the exemplary embodiments.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, the exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the example embodiments.

Unless otherwise defined, all terms (including technical and scientific terms) used herein have the same meaning as commonly understood by one of ordinary skill in the art to which the exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1B:
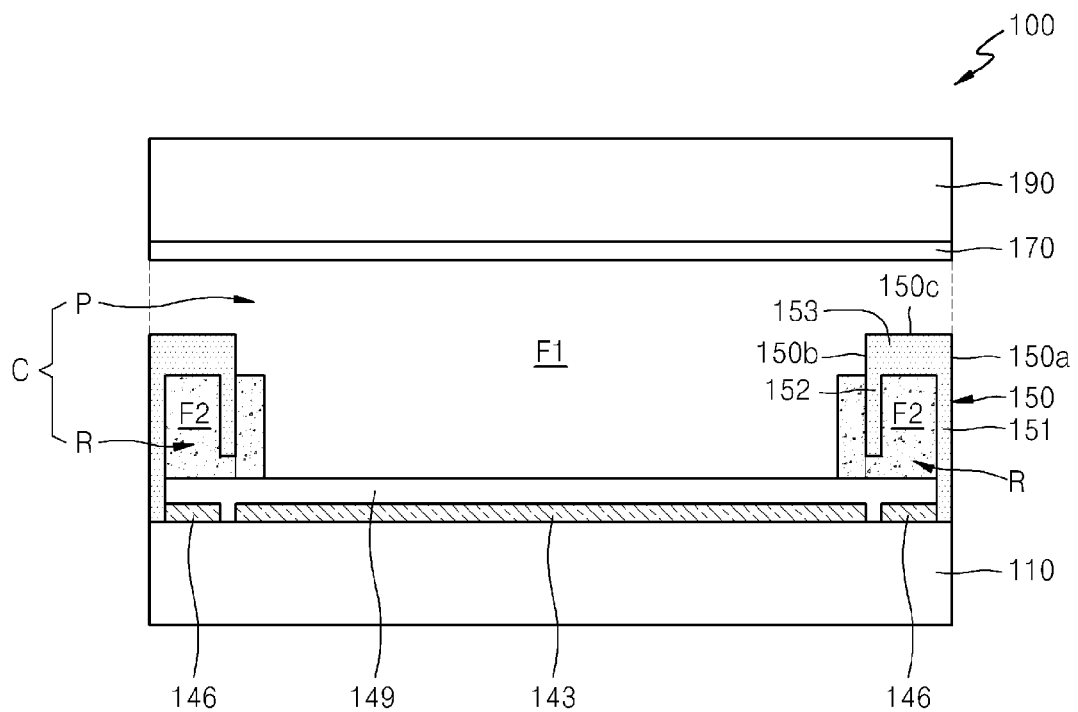

FIGS. 1A and 1B are schematic cross-sectional views illustrating a structure of an electrowetting display device 100, wherein FIG. 1A shows pixel-off state in which light is blocked and FIG. 1B shows a pixel-on state in which light is transmitted, according to an example embodiment.

FIGS. 1A and 1B, the electrowetting display device 100 includes first and second substrates 110 and 190; a cell region C between the first and second substrates 110 and 190, the cell region including a pixel region P and reservoir regions R; a conductive first fluid F1 that is conductive, is disposed in the cell region C, and flows according to the electrowetting principle; a second fluid F2 that is non-conductive and is not mixed with the conductive first fluid F1; a pixel electrode 143 that turns on/off of the pixel region P; and an electrode unit that includes at least one reservoir electrode 146 for promoting flow of the first fluid F1 or the second fluid F2 into the reservoir regions R.

In the electrowetting display device 100 according to the current embodiment, the reservoir regions R are formed in regions that do not contribute to pixel formation, and thus, provide a configuration that may increase an aperture ratio by inducing a fluid into the reservoir regions R that display a color or a black color when a pixel is ON.

The configuration of the electrowetting display device 100 is as follows.

A pixel electrode 143 and reservoir electrodes 146 are formed on the first substrate 110, and an insulating material layer 149 is formed to cover the pixel electrode 143 and the reservoir electrodes 146. The pixel electrode 143 is formed at a location facing the pixel electrode P, and the reservoir electrodes 146 are formed at locations facing the reservoir regions R.

The first substrate 110 may be formed of a transparent plastic material or a glass material. The pixel electrode 143 and the reservoir electrodes 146 may be formed of a transparent electrode material or a metal.

A partition unit 150 is formed to define the pixel region P. In the electrowetting display device 100, the partition unit 150 is formed in an inactive region that does not contribute to the pixel formation. The inactive region may be, for example, a black matrix region of a color filter (not shown), or a region where a thin film transistor (TFT) (not shown) for driving the pixel electrode 143 is formed. In the electrowetting display device 100 according to the current embodiment, the reservoir region R is formed in the partition unit 150.

The partition unit 150 includes a first surface 150a facing outwards of the cell region C, a second surface 150b facing the cell region C, and a third surface 150c that connects the first and second surfaces 150a and 150b and faces upwards of the cell region C. The reservoir region R may be formed between the first and second surfaces 150a and 150b. More specifically, the partition unit 150 includes a first wall 151 having a first surface 150a, a second wall 152 that is separated from the first wall 151 and has a second surface 150b, and a third wall 153 that connects the first and second walls 151 and 152 and has a third surface 150c, and the reservoir region R may be provided in a space surrounded by the first through third walls 151, 152, and 153. The second wall 152 is separated from a bottom of the cell region C by a given (or alternatively, predetermined) distance to provide a flow path D through which the first fluid F1 and the second fluid F2 flows between the reservoir region R and the cell region C.

The first fluid F1 is transparent, and the second fluid F2 may block light. For example, the first fluid F1 may be a transparent electrolyte, such as water, and the second fluid F2 may be oil including a black dye.

Also, the first fluid F1 may be transparent, and the second fluid F2 may transmit light of a given (or alternatively, predetermined) color. For example, the first fluid F1 may be a transparent electrolyte, such as water, and the second fluid F2 may be oil including a color dye.

The second substrate 190 is formed to cover the cell region C, and a common electrode layer 170 may be formed on a lower surface of the second substrate 190. The second substrate 190 may be formed of a glass material or a transparent plastic material. The common electrode layer 170 may be formed of a transparent electrode material.

A method of turning ON/OFF pixels of the electrowetting display device 100 will now be described.

The electrowetting display device 100 may be operated, as depicted in FIG. 1A, in a first mode in which the transparent first fluid F1 is moved to the reservoir region R, or, as depicted in FIG. 1B, in a second mode in which the second fluid F2 that shows a black color or other color is moved to the reservoir region R.

Referring to FIG. 1A, an attractive electric force is formed between the first fluid F1 and the reservoir electrode 146, no electric force is formed between the second fluid F2 and the pixel electrode 143, and thus, the first fluid F1 flows into the reservoir region R. Also, the first fluid F1 is well maintained in the reservoir region R since no electric force is formed between the first fluid F1 and the pixel electrode 143. Since the attractive electric force acts between the first fluid F1 and the reservoir electrode 146, the second fluid F2 is pushed away by the flow of the first fluid F1, and thus, the second fluid F2 is maintained in the entire pixel region P. Accordingly, the pixel region P displays the color of the second fluid F2.

In order to form the first mode, an electric potential is applied to the first fluid F1 and the reservoir electrode 146 so that an electric potential difference is generated between the first fluid F1 and the reservoir electrode 146, and the same electric potential is applied to the pixel electrode 143 and the first fluid F1. For example, when an electric potential of +15V is applied to the common electrode layer 170 that contacts the first fluid F1 and an electric potential of −15V is applied to the reservoir electrode 146, an electric potential of +15V may be applied to the pixel electrode 143 as the same electric potential as the common electrode layer 170. However, the above values of the electrical potential are just examples.

Referring to FIG. 1B, when an attractive electric force is formed between the first fluid F1 and the pixel electrode 143, and no electric force is formed between the first fluid F1 and the reservoir region R, the first fluid F1 is disposed in the pixel region P and a majority of the second fluid F2 moves to the reservoir region R by being pushed away by the flow of the first fluid F1. Also, as no electric force acts between the first fluid F1 and the reservoir electrode 146, almost all of the first fluid F1 is well located in the cell region C, and also, almost all of the second fluid F2 is well located in the reservoir region R. Accordingly, only the transparent first fluid F1 is located in the pixel region P, and thus, the pixel region P is in a transparent state.

In order to form the second mode, an electric potential is applied to the first fluid F1 and the pixel electrode 143 so that an electric potential difference is generated between the first fluid F1 and the pixel electrode 143, and the same electric potential is applied to the reservoir electrode 146 and the first fluid F1. For example, when an electric potential of +15V is formed in the common electrode layer 170 that contacts the first fluid F1 and an electric potential of −15V is applied to the pixel electrode 143, an electric potential of +15V may be applied to the reservoir electrode 143, which is equal to electric potential applied to the common electrode layer 170. However, the above values of the electric potential are just examples.

Figure 2A:
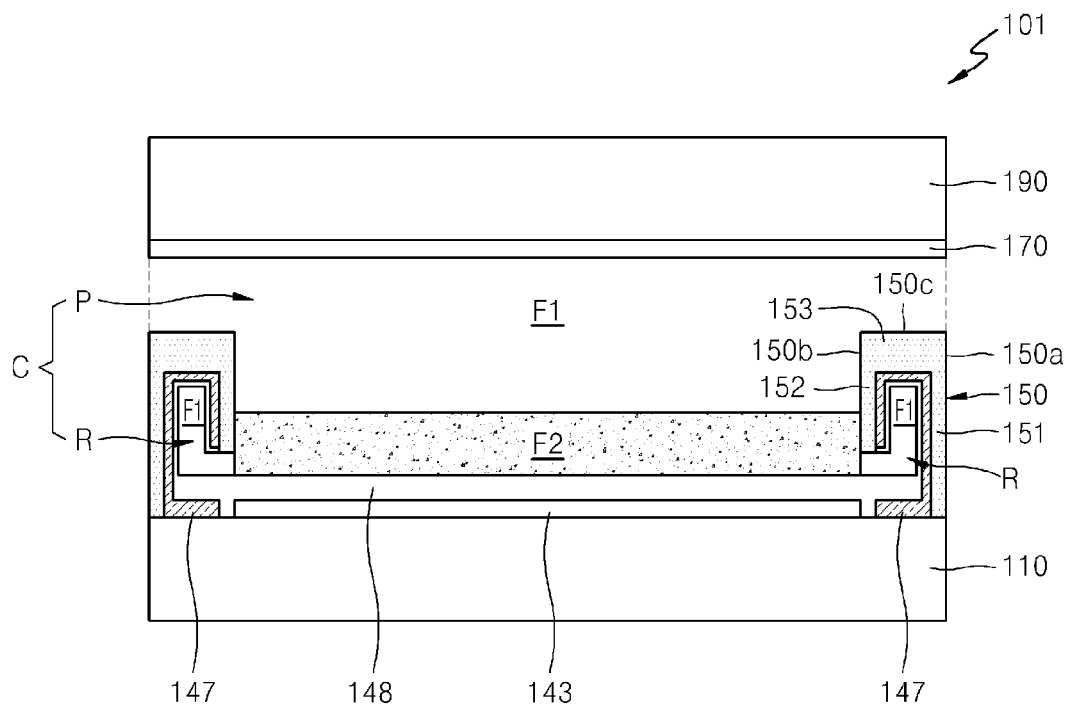
Figure 2B:
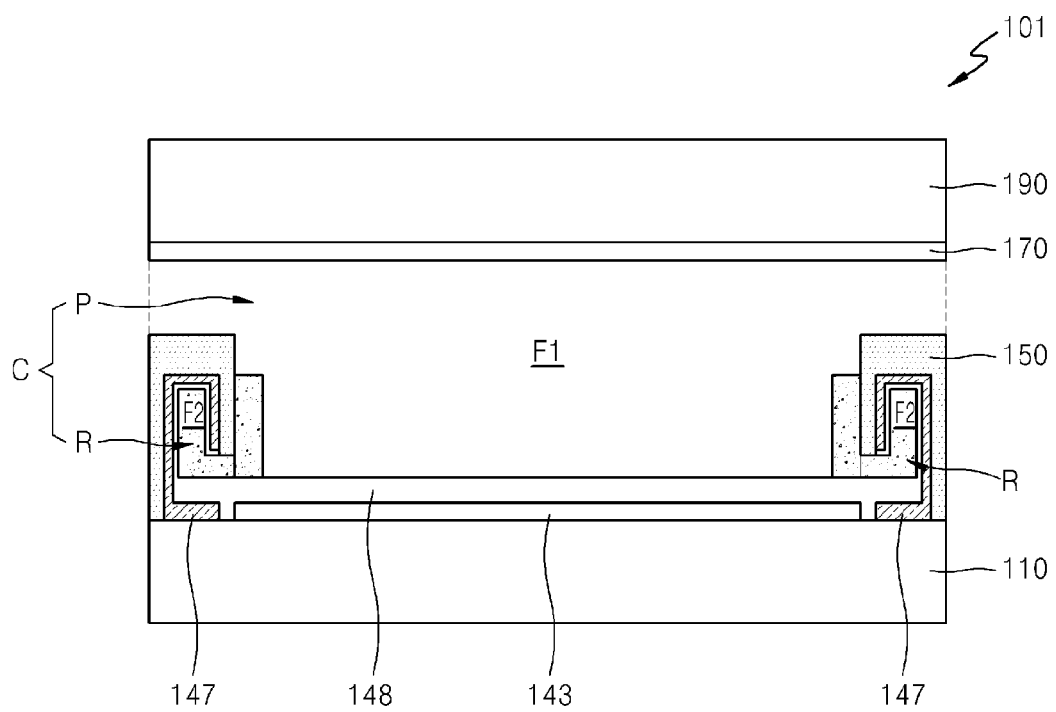

FIGS. 2A and 2B are schematic cross-sectional views illustrating a structure of an electrowetting display device 101, wherein FIG. 2A shows a pixel-on state in which light is blocked and FIG. 2B is a pixel-off state in which light is transmitted, according to another example embodiment.

The electrowetting display device 101 according to the current embodiment is different from the electrowetting display device 100 described with reference to FIGS. 1A and 1B in that a reservoir electrode 147 of the electrowetting display device 101 has a shape extending along the first wall 151 from a region on the substrate 110.

The reservoir electrode 147 having the above shape is provided to increase flow efficiency of the first fluid F1 to the reservoir region R. The reservoir electrode 147 may extend to the third wall 153, and as depicted in FIG. 2A, may extend to the second wall 152 through the third wall 153, but the inventive concepts are not limited thereto.

FIG. 3 a schematic cross-sectional view illustrating a structure of an electrowetting display device 200 according to another example embodiment.

A plurality of pixel regions is formed on the first substrate 210. Each of the plurality of pixel region includes a pixel electrode 243 and a reservoir electrode 246 which are covered by an insulating material layer 249, and a partition unit 250, inside which reservoir regions R are formed. In each pixel region, a first fluid F1 and the second fluid $F_R$, $F_G$, and $F_B$ are disposed. In the current embodiment, the second fluid $F_R$, $F_G$, and $F_B$ includes a single color dye. That is, the first fluid F1 is formed of a transparent electrolyte, such as water, and the second fluid $F_R$, $F_G$, and $F_B$ may be formed of oil including single color dyes. Also, the second fluid $F_R$, $F_G$, and $F_B$ is provided so that adjacent pixel regions may display red R, green G, and blue B colors.

The pixel regions may be sealed by a second substrate 290 on which a common electrode layer 270 is formed.

In the structure of FIG. 3, two reservoir regions R are formed in a single pixel region, but it is an example. The configuration of the partition unit 250 may be simplified to include a single reservoir region R in a single pixel region. Also, it is depicted that all reservoir regions R include the reservoir electrodes 246, but it is also an example. That is, the reservoir electrode 246 may be formed in only some of the reservoir regions R.

The electrowetting display device 200 may be operated as a reflective display device that displays an image by using external light A. In this case, the pixel electrode 243 may be formed of a reflective metal material, or a reflection plate (not shown) may be further formed on a surface of the first substrate 210. In this case, the pixel electrode 243 may be formed of a transparent electrode material.

Figure 4:
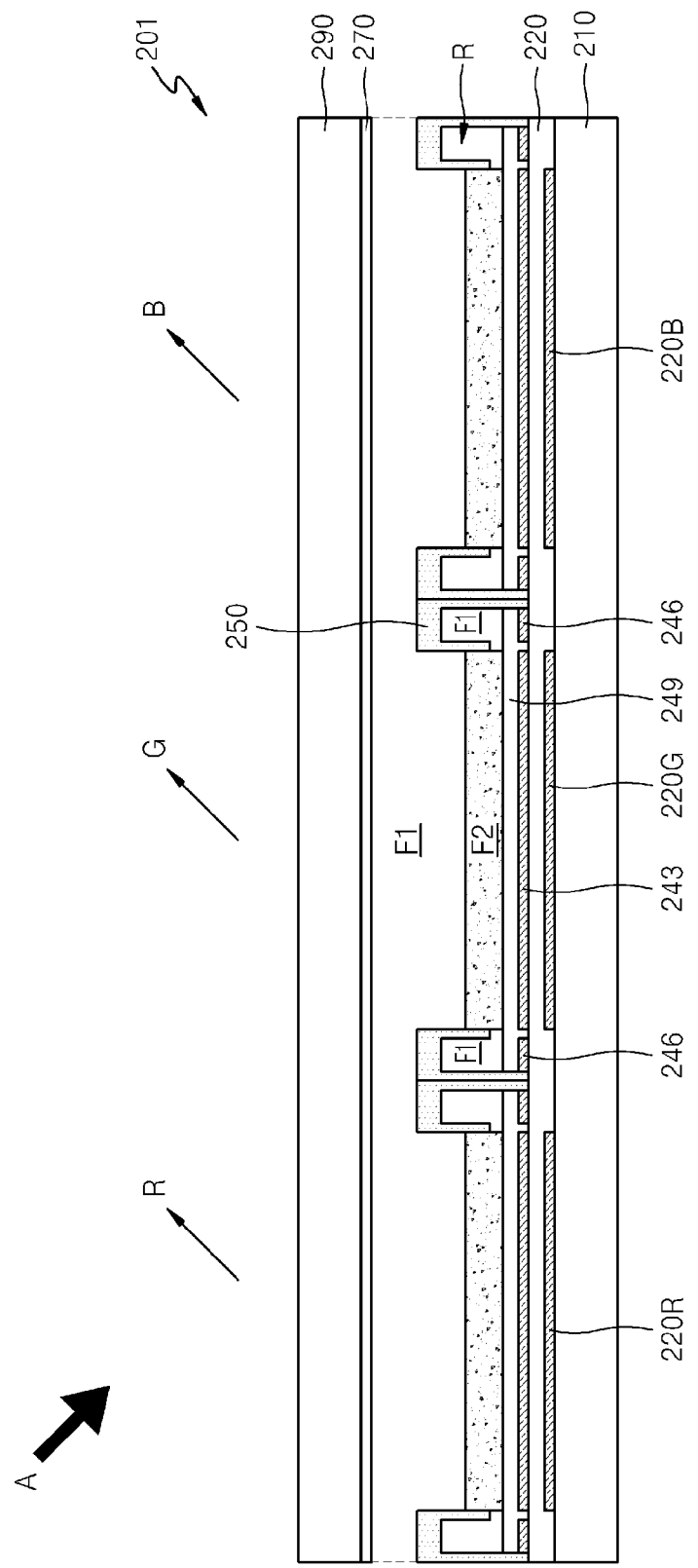
FIG. 4 a schematic cross-sectional view illustrating a structure of an electrowetting display device according to another example embodiment.

FIG. 4 a schematic cross-sectional view illustrating a structure of an electrowetting display device 201 according to another example embodiment.

In the current embodiment, the second fluid F2 includes a black dye. That is, the first fluid F1 is formed of a transparent electrolyte, such as water, and the second fluid F2 is formed of oil including a black dye.

Also, a reflective color filter 220 is disposed on a first substrate 210. The reflective color filter 220 may include photonic crystal layers 220R, 220G, and 220B that respectively reflect light of red R, green G, and blue B wavelength bands. In this case, the pixel electrode 243 may be formed of a transparent electrode material.

The electrowetting display device 201 may be operated as a reflective display device that forms an image by using external light A.

In the structure of FIG. 4, two reservoir regions R are formed in a single pixel region, but this is just an example. The configuration of the partition unit 250 may be simplified to include a single reservoir region R in a single pixel region. Also, although it is depicted that all reservoir regions R include the reservoir electrodes 246, this is also just an example. That is, the reservoir electrodes 246 may be formed in only some of the reservoir regions R.

Figure 5:
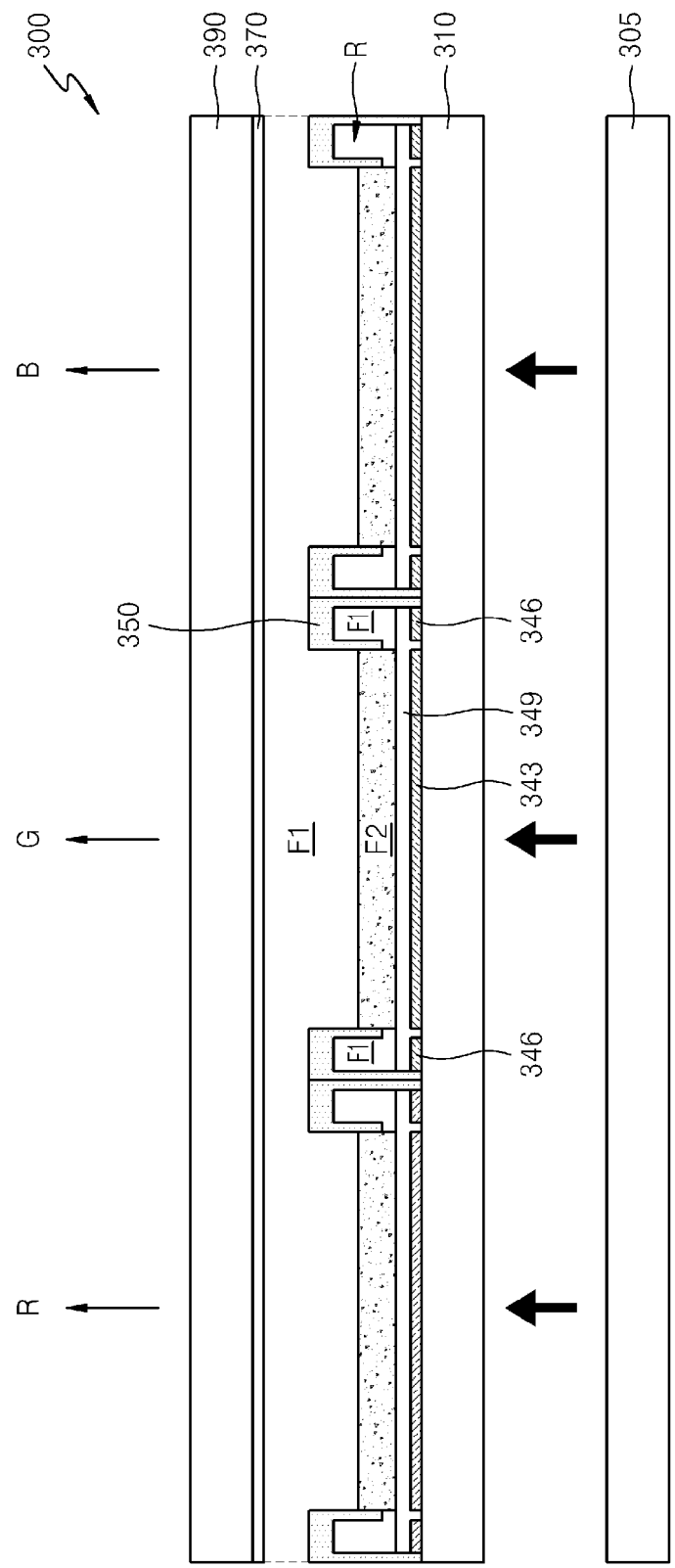
FIG. 5 a schematic cross-sectional view illustrating a structure of an electrowetting display device according to another example embodiment.

FIG. 5 a schematic cross-sectional view illustrating a structure of an electrowetting display device 300 according to another example embodiment.

Differently from the previous embodiments, the electrowetting display device 300 according to the current embodiment further includes a back light device 305 that provides light for forming an image.

A plurality of pixel regions is formed on a first substrate 310. Each of the plurality of pixel regions includes a pixel electrode 343 and a reservoir electrode 346 covered by an insulating material layer 349, and a partition unit 350, inside which reservoir regions R are formed. A first fluid F1 and a second fluid F2 are disposed in each pixel region. In the current embodiment, the second fluid F2 includes a single color dye. That is, the first fluid F1 is formed of a transparent electrolyte, such as water, and the second fluid F2 ($F_R$, $F_G$, and $F_B$) may be formed of oil including single-color dyes. Also, the second fluid F2 is provided so that adjacent pixel regions may display red R, green G, and blue B colors.

The pixel regions may be sealed by a second substrate 390 on which a common electrode layer 370 is formed.

The back light device 305 that provides light for forming an image is disposed at a lower part of the first substrate 310, and an image is formed by on/off modulation of the light in each pixel region.

FIG. 6 a schematic cross-sectional view illustrating a structure of an electrowetting display device 301 according to another example embodiment.

The electrowetting display device 301 according to the current embodiment is a transmission type display device having the back light device 305, and the first fluid F1 formed of a transparent electrolyte, such as water, and the second fluid F2 formed of oil including a black dye are placed in each pixel region.

A transmissive color filter 380 for forming a color is further formed on a second substrate 390. More specifically, the transmissive color filter 380 having color regions 380R, 380G, and 380B, an insulating layer 375, and a common electrode layer 370 are formed on the second substrate 390.

In the electrowetting display devices 300 and 301 of FIGS. 5 and 6, the configurations of the partition unit 350 may be simplified to include a single reservoir region R in a single pixel region. Also, it is depicted that all reservoir regions R include the reservoir electrodes 346, but this is an example. That is, the reservoir electrodes 346 may be formed in only some of the reservoir regions R.

Also, in the electrowetting display devices 200, 201, 300, and 301 according to various example embodiments, the shapes of the reservoir electrodes 246 and 346 are the same as the shape of the reservoir electrode 146 of FIG. 1A, but may be changed to have the shape of the reservoir electrode 147 of FIG. 2A.

FIGS. 7A through 7G are cross-sectional views showing a method of manufacturing the electrowetting display device 100 according to an example embodiment.

Figure 7A:
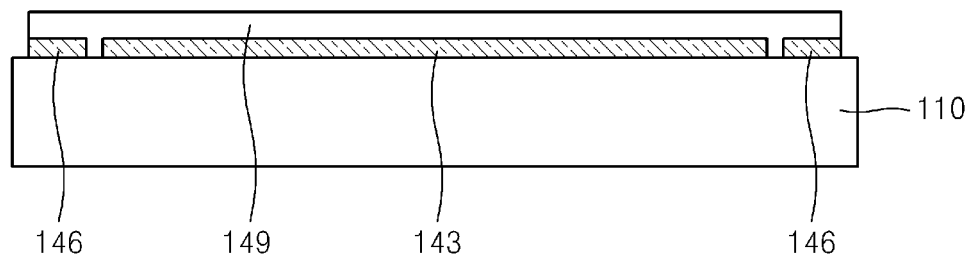
FIGS. 7A through 7G are cross-sectional views showing a method of manufacturing an electrowetting display device according to an example embodiment.

Referring to FIG. 7A, first, the pixel electrode 143 and the reservoir electrodes 146 are formed, and afterwards, the insulating material layer 149 covering the pixel electrode 143 and the reservoir electrodes 146 are formed on the first substrate 110.

FIGS. 7B through 7E illustrate a process of forming partition unit 150 that defines pixel regions, and also, forming a structure in which the reservoir region R is formed inside the partition unit 150.

Figure 7B:
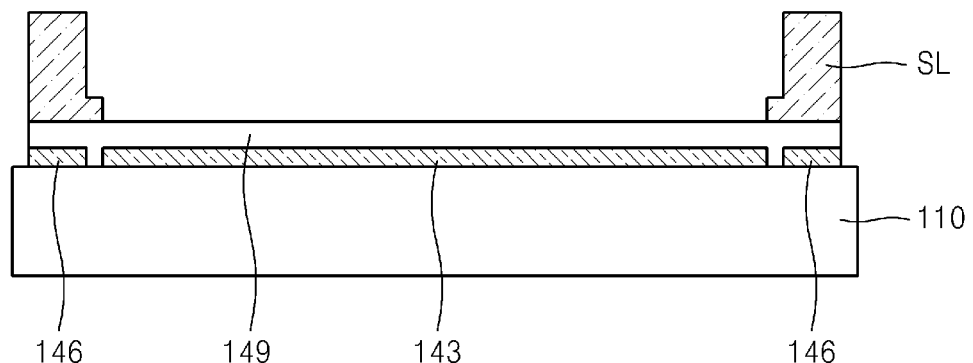

Referring to FIG. 7B, sacrificial pattern layers SL having a shape corresponding to the reservoir region R to be formed are formed at locations where the partition unit 150 is formed. As depicted in FIG. 7B, the sacrificial pattern layer SL may have a stepped surface facing the pixel region.

Figure 7C:
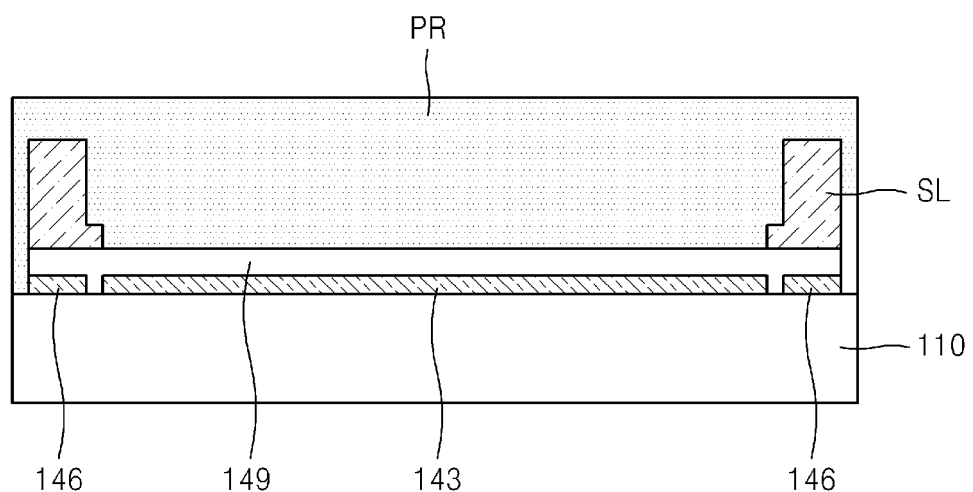
Figure 7D:
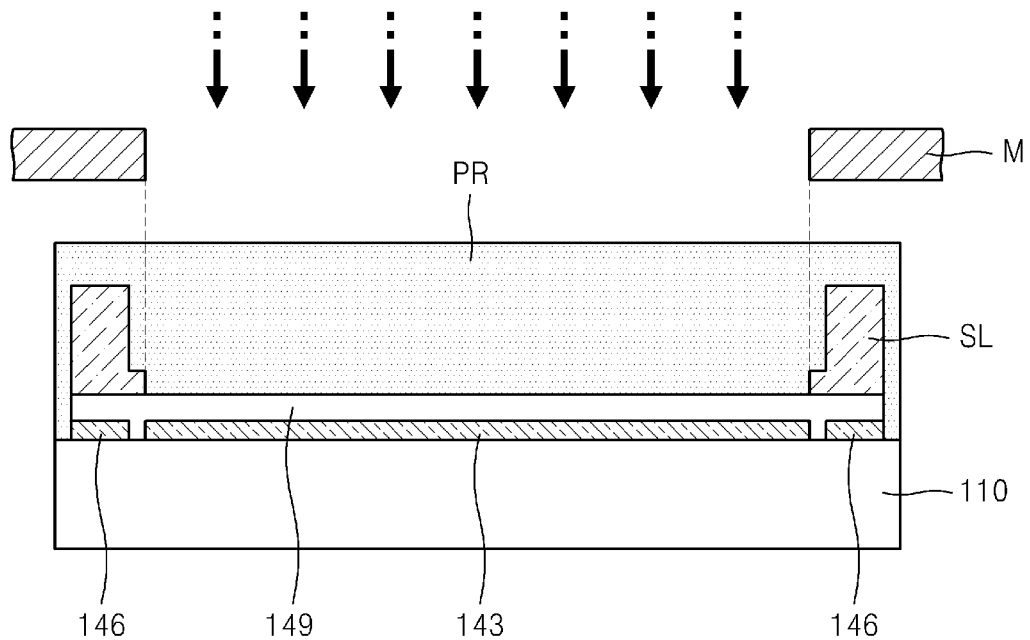

FIGS. 7C and 7D show processes of forming the partition unit 150 by using a material having an etch selectivity with respect to a material used to form the sacrificial pattern layers SL along surfaces of the sacrificial pattern layers SL.

As depicted in FIG. 7C, a photoresist material PR having an etch selectivity with respect to a material used to form the sacrificial pattern layers SL is formed to cover entire sacrificial pattern layers SL on the first substrate 110. Afterwards, as depicted in FIG. 7D, light is irradiated onto regions of the photoresist material PR except for the portions of the photoresist material PR that are to be partition unit 150. The location of the exposure region is just an example. In case that the photoresist material PR is a negative photoresist, the exposure regions may be changed to portions of the photoresist material PR that are to be partition unit 150.

Figure 7E:
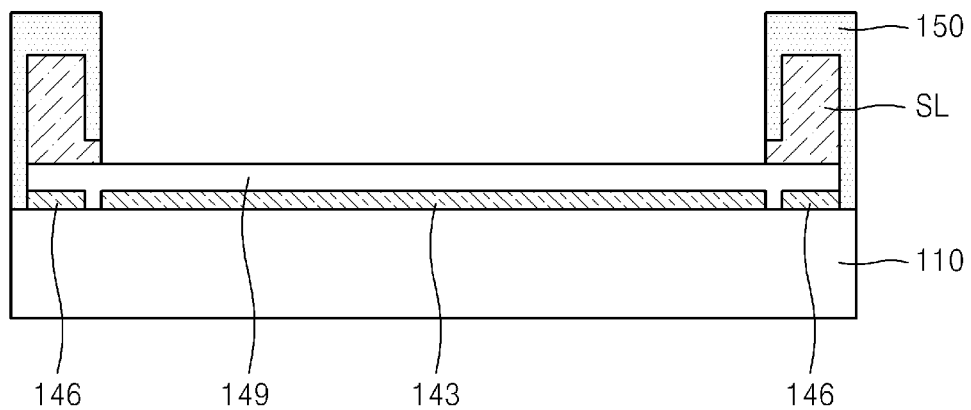
Figure 7F:
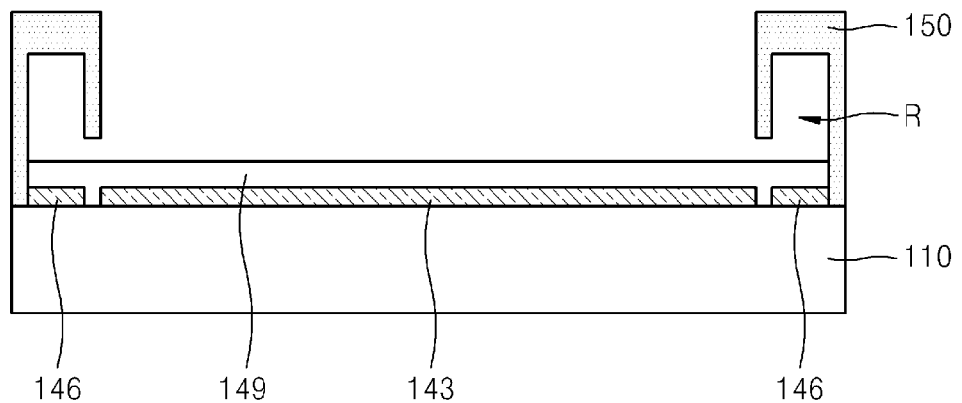

Next, an exposed portion of the photoresist material PR is removed by using a developing agent, as depicted in FIG. 7E, and thus, the partition unit 150 is formed. Also, when the sacrificial pattern layers SL are selectively etched, as depicted in FIG. 7F, the manufacture of a partition structure in which the reservoir region R is formed is completed.

Next, the conductive first fluid F1 and the second fluid F2 that is non-conductive and is not mixed with the first fluid F1 are disposed in the pixel regions. The first fluid F1 may be transparent, and the second fluid F2 may block light or transmits only light of a given (or alternatively, predetermined) color. For example, the first fluid F1 may be a transparent electrolyte, and the second fluid F2 may be oil including a black dye or a color dye.

Next, the pixel region is covered by the second substrate 190. The common electrode layer 170 may be formed on the second substrate 190 to apply a voltage to the first fluid F1.

Figure 7G:
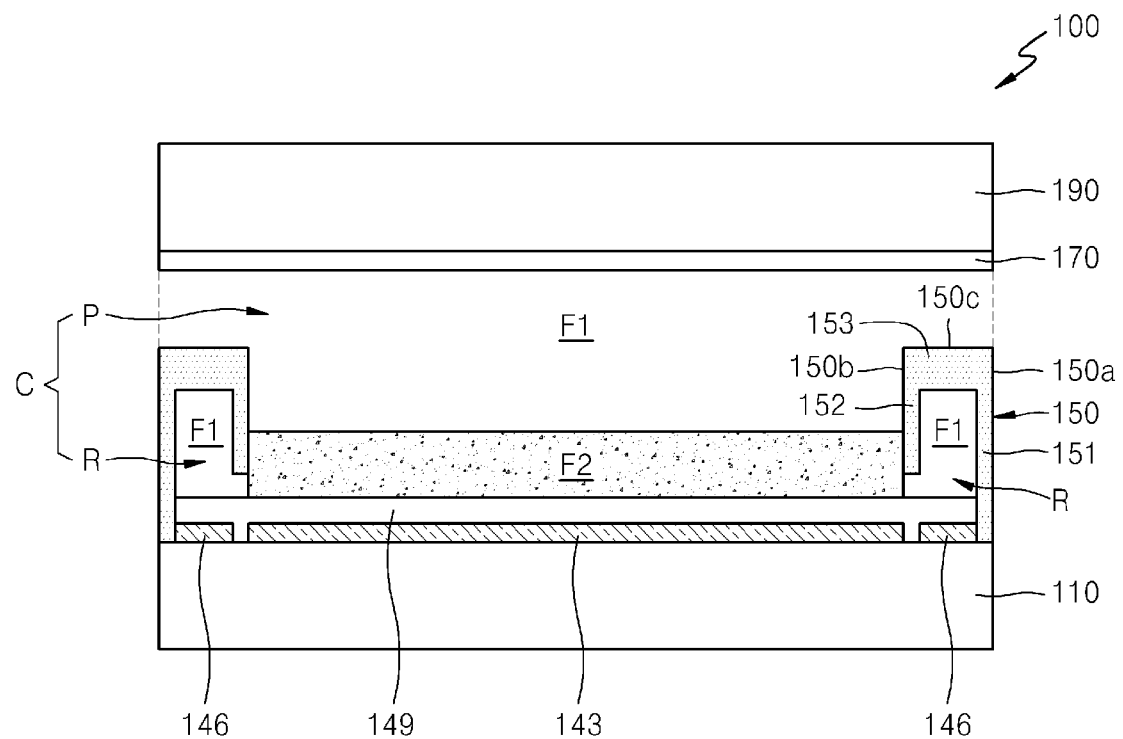

As a result, as depicted in FIG. 7G, the electrowetting display device 100 is manufactured so that the cell region C includes the pixel region P and the reservoir region R formed in the partition unit 150.

Since the electrowetting display device described above includes the reservoir region and the reservoir electrode, the flow of fluid by electrowetting is efficient. Accordingly, an on/off operation of a pixel is ensured.

Also, the reservoir region R may be formed in the partition unit that are formed at locations corresponding to the inactive region, for example, the black matrix region that does not contribute to pixel formation, and thus, the aperture ratio is increased.

In the method of driving the electrowetting display device according to an example embodiment, a voltage is applied so that the flow of fluid in and out of the reservoir region is smooth.

According to the method of manufacturing the electrowetting display device according to an example embodiment, the reservoir region may be readily formed after forming a sacrificial pattern layer corresponding to the shape of the reservoir region, forming a partition layer on a surface of the sacrificial pattern layer by using a material having an etch selectivity different from that of the sacrificial pattern layer, and then removing the sacrificial pattern layer.

While an electrowetting display device, a method of driving the same, and a method of manufacturing the same according to the inventive concepts have been particularly shown and described with reference to example embodiments thereof, it will be understood by those of ordinary skill in the art that various changes in form and details may be made therein without departing from the spirit and scope of the following claims.

What is claimed is:

1. An electrowetting display device comprising:
    first and second substrates facing each other and separated from each other;
    a cell region between the first and second substrates, the cell region including a pixel region and a reservoir region;
    a first fluid and a second fluid in the cell region, the first fluid being conductive and flowing according to an electrowetting principle and the second fluid being non-conductive and not mixed with the first fluid;
    an electrode unit turning on and off the pixel region, the electrode unit including a pixel electrode coated with an insulating material and at least one reservoir electrode coated with the insulating material to promote flow of one of the first fluid and the second fluid into the reservoir region; and
    a partition unit on the first substrate, the partition unit defining the cell region and including a first surface facing outward from the cell region, a second surface facing the cell region, and a third surface connecting the first and second surfaces and facing upward from the cell region,
    wherein the reservoir region is in a region between the first and second surfaces of the partition unit.

2. The electrowetting display device of claim 1, wherein the electrode unit further comprises a common electrode on a surface of the second substrate closest to the first substrate.

3. The electrowetting display device of claim 2, wherein the pixel electrode is on a surface of the first substrate facing the pixel region, and the reservoir electrode is on a surface of the first substrate facing the reservoir region.

4. The electrowetting display device of claim 1, wherein
    the partition unit includes a first wall having the first surface, a second wall having the second surface and separate from the first wall, and a third wall having the third surface and connecting the first and second walls, and
    the reservoir region is surrounded by the first through third walls.

5. The electrowetting display device of claim 4, wherein the second wall is separated from a bottom surface of the cell region by a distance to form a flow path through which the first fluid and the second fluid flow between the pixel region and the reservoir region.

6. The electrowetting display device of claim 4, wherein the reservoir electrode extends along the first wall from a surface of the first substrate facing the reservoir region.

7. The electrowetting display device of claim 6, wherein the reservoir electrode extends towards the third wall.

8. The electrowetting display device of claim 1, wherein the first fluid is transparent and the second fluid blocks light.

9. The electrowetting display device of claim 8, further comprising:
a reflective color filter on the first substrate.

10. The electrowetting display device of claim 8, further comprising:
a back light device on a surface of the first substrate furthest from the second substrate; and
a transmissive color filter on a surface of the second substrate closest to the first substrate.

11. The electrowetting display device of claim 1, wherein the first fluid is transparent, and the second fluid transmits light of a given color.

12. The electrowetting display device of claim 11, further comprising:
a back light device on a surface of the first substrate furthest from the second substrate.

13. A method of driving the electrowetting display device of claim 1, the method comprising:
applying an attractive electric force between the first fluid and the reservoir electrode and not between the first fluid and the pixel electrode so that the first fluid moves into the reservoir region; and
applying an attractive electric force between the first fluid and the pixel electrode and not between the first fluid and the reservoir electrode so that the second fluid moves into the reservoir region.

14. The method of claim 13, wherein
the pixel region blocks light when applying an attractive electric force between the first fluid and the reservoir electrode and not between the first fluid and the pixel electrode, and
the pixel region transmits light when applying an attractive electric force between the first fluid and the pixel electrode and not between the first fluid and the reservoir electrode.

15. The method of claim 13, wherein
the pixel region transmits light of a given color when applying an attractive electric force between the first fluid and the reservoir electrode and not between the first fluid and the pixel electrode, and
the pixel region transmits light of a given color when applying an attractive electric force between the first fluid and the pixel electrode and not between the first fluid and the reservoir electrode.

16. The method of claim 13, wherein
the applying an attractive electric force between the first fluid and the reservoir electrode and not between the first fluid and the pixel electrode applies an electric potential to the first fluid and the reservoir electrode so that an electric potential difference is generated between the first fluid and the reservoir electrode and applies an electric potential equal to that of the first fluid to the pixel electrode, and
the applying an attractive electric force between the first fluid and the pixel electrode and not between the first fluid and the reservoir electrode applies an electric potential to the first fluid and the pixel electrode so that an electric potential difference is generated between the first fluid and the pixel electrode and applies an electric potential equal to that of the first fluid to the reservoir electrode.

17. A method of manufacturing an electrowetting display device, the method comprising:
forming a pixel electrode and a reservoir electrode on a first substrate and forming an insulating material layer covering the pixel electrode and the reservoir electrode;
forming a cell region on the first substrate including,
forming a partition unit to define a pixel region, the partition unit including a first surface facing outward from the cell region, a second surface facing the cell region, and a third surface connecting the first and second surfaces and facing upward from the cell region, and
forming a reservoir region inside the partition unit in a region between the first and second surfaces of the partition unit;
disposing a first fluid and a second fluid in the cell region, the first fluid being conductive and the second fluid being non-conductive and not mixed with the first fluid; and
covering the cell region with a second substrate.

18. The method of claim 17, wherein the forming a cell region comprises:
forming a sacrificial pattern layer having a shape corresponding to the reservoir region that is to be formed inside the partition unit;
forming a partition unit material layer along surfaces of the sacrificial pattern layer using a material having an etch selectivity with respect to a material of the sacrificial pattern layer; and
removing the sacrificial pattern layer.

* * * * *